Feb. 5, 1935. J. R. JOHNSON Re. 19,448

MACHINE TOOL SLIDE AND LUBRICATOR THEREFOR

Original Filed March 19, 1931 2 Sheets-Sheet 1

Inventor
John R. Johnson
By William H. Knight
Attorney

Feb. 5, 1935. J. R. JOHNSON Re. 19,448
MACHINE TOOL SLIDE AND LUBRICATOR THEREFOR
Original Filed March 19, 1931 2 Sheets-Sheet 2
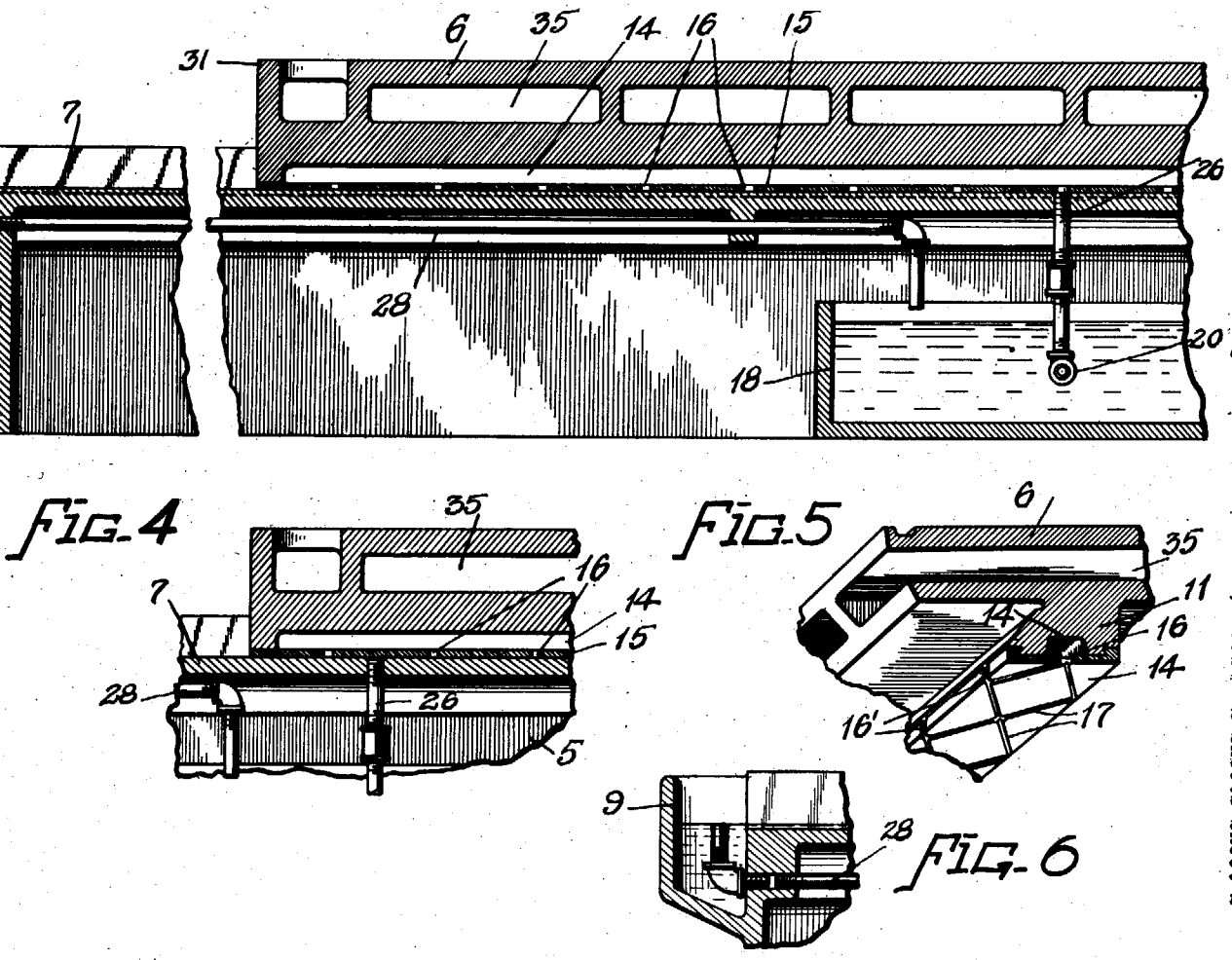
Inventor
John R. Johnson
By William H. Knight
Attorney Reissued Feb. 5, 1935 Re. 19,448

UNITED STATES PATENT OFFICE 19,448

MACHINE TOOL SLIDE AND LUBRICATOR THEREFOR

John R. Johnson, Rockford, Ill., assignor to The Ingersoll Milling Machine Company, Rockford, Ill., a corporation of Illinois Original No. 1,903,865, dated April 18, 1933, Serial No. 523,793, March 19, 1931. Application for reissue December 3, 1934, Serial No. 755,838

8 Claims. (Cl. 184—6)

The present invention relates in general to machine tools and has particular reference to machine tool slide and lubricator therefor.

One object of the invention is to provide an improved machine tool slide or ways on which a table or other machine tool part is mounted for reciprocation or other sliding movement.

Another object of the invention is to improve the lubricating facilities for machine tool slides whereby a preponderance of lubricant can be distributed over the slide or ways in such quantities as to flood the ways so that they will be substantially submerged for all practical purposes.

With these and other objects in view, the invention will be more readily understood upon reference to the accompanying drawings which have been selected for the purpose of illustrating the application of the invention.

In said drawings, Figure 1 is a view in perspective of a portion of a milling machine table and bed, showing an application of the invention;

Figure 3 is a section taken on the line 3—3, Fig. 2;

Figure 4 is a detail view in section.

Figure 5 is a detail view in perspective and partly in section; and

Figure 6 is a detail view of another form of pan drain.

Figure 1:
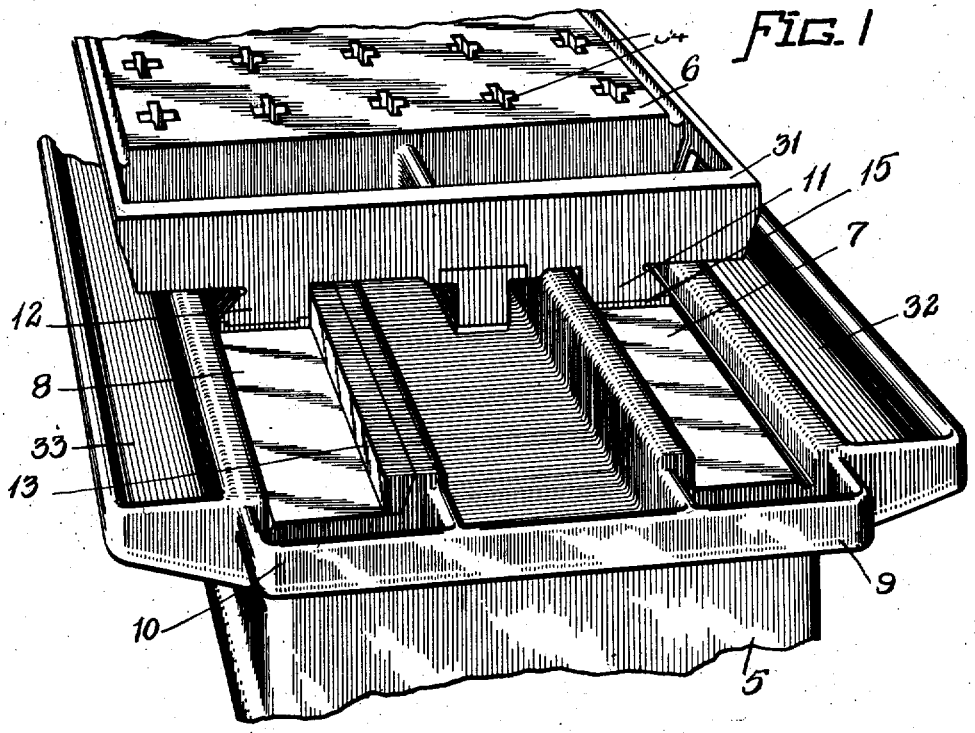
Figure 2:
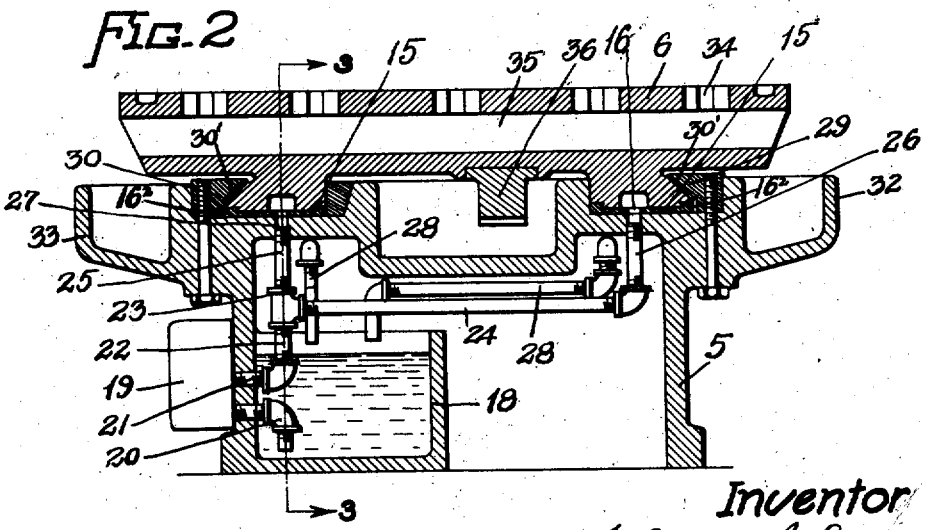
Figure 2 is a view in cross section of a milling machine table and bed with the invention applied thereto.

Referring now to the drawings in detail, 5 represents a milling machine bed upon which the table 6 is mounted for reciprocal movement. The bed 5, to accommodate the table for such reciprocal movement, is made with spaced parallel ways or slides 7 and 8 each of which being formed at the bottom of a trough-like structure. At the end of each of these troughs are pans 9 and 10 which are deeper than the troughs. Slidably mounted in these troughs are the ways 11 and 12 of the table 6, suitable gibbing 13 being provided for one of the troughs as shown.

Each of the table ways 11 and 12 is made with a closed ended lubricant distributing reservoir 14 and a shoe 15 made of bronze, brass or other material suitable for the purpose, is dove-tailed upon the bottom of the table ways. These shoes become the contact surface on the table ways which slide along the bed ways 7 and 8 and in intimate contact therewith, and it is these contacting surfaces, which the lubricating facilities provided, serve.

In order to supply a preponderance of lubricant to these contacting surfaces in sufficient quantity so that they will always be flooded and submerged, the shoes 15 are each formed with a series of lubricant supply ducts 16 at spaced intervals in the length of the shoes. These ducts 16 communicate with the distributing reservoirs 14 and terminate in wiping relation with the bed ways 7 and 8. To better distribute the lubricant, the undersides of the shoes 15 are scored with distributing channels or grooves 17 which crisscross the undersides of the shoes and intersect at the ducts 16. In this way each duct is thus equipped with a cluster-like plurality of distributing grooves which extend diagonally across the surface of the shoes and up the side edges thereof as at 16'. By means of the grooves 16' in the edges of the shoes, sufficient lubricant is directed to the sides of the ways to lubricate the same. In this connection these edge grooves 16' communicate with the clearance spaces $16^2$. Felt pads 30' are also inset in the clamps 30 to absorb the lubricant forced into the clearance spaces $16^2$, and these pads serve to keep the top side of the bevels wet with lubricant. On the opposite or straight side of the ways the lubricant will be forced between the contacting side surfaces in sufficient quantity to assure the desired lubrication.

The distributing reservoirs 14 serve in the capacity of sub-sources of supply for the lubricant and they are in turn supplied with lubricant in sufficient quantity to keep them completely filled and under pressure from a main source of supply comprising the sump-like receptacle 18. From this sump-like receptacle, the lubricant is pumped into the distributing reservoirs 14 by a pump 19 which has an intake 20 terminating adjacent the bottom of the sump 18, and an outlet 21 which is connected with a pipe 22. The pipe 22 is equipped with an L-fitting 23 to supply a branch pipe 24 leading to one of the reservoirs 14; and the other pipe section 25 which joints the L-23 leads to the other reservoir. The ends of these pipes 24 and 25 are preferably threaded as at 26 and 27 into openings formed in the thickness of the bed ways 7 and 8 so as to establish a communication with the bearing surfaces on the ways. These openings, one for each of the ways 7 and 8, are preferably formed intermediate the ends of the ways and are aligned with the distributing ducts 16 so that as the table reciprocates, the ducts 16 will successively register with these openings and make and break a registering communication between the reservoirs 14 and the supply pipes 24 and 25. Since the pump 19 is running continuously, there is always a head of lubricant under pressure in the pipes 24 and 25, and each time one of the ducts registers with the openings in the bed ways, a quantity of lubricant will be forced under pressure into the distributing reservoirs 14. In this way, the distributing reservoirs 14 are constantly being charged with lubricant so that there will always be a preponderance of lubricant under pressure to be distributed through the ducts 16.

Communicating with each of the pans 9 and 10 at one end of the ways are return pipes 28 which lead back into the sump 18. The return capacity of these pipes 28 can be predetermined so as to maintain the desired lubricant level on the ways and in the pans 9 and 10; consequently, not only are the supporting surfaces of the ways thoroughly lubricated, but also the sides of the troughs 7 and 8 where the table ways 11 and 12 contact are also thus lubricated.

If desirable, the return pipes 28 may communicate with the pans 9 and 10 at a height as shown in Fig. 6 to maintain a desired level on the ways. If this is resorted to, it will not be necessary to reckon their return capacity.

In addition to the gibbing 13, the ways are also equipped with clamps 29 and 30 which are of a relatively short length and overlie the beveled sides of the table ways 11 and 12. The clamps are bolted in place as shown.

The table 6 is constructed at its ends with pans 31 for collecting the cooling fluid off the table. These pans communicate with side troughs 32 and 33 arranged along the sides of the bed and are suitable to prevent the cooling fluid getting on the slides. The table also is made with a multiplicity of cross shaped openings 34 in its thickness which communicate with spaces 35 under the table. These spaces 35 open at the sides of the table and allow the coolant to overflow into the pans 32 and 33.

Attention is called to the fact, since the bed ways are formed by machining the material from which the bed is cast and since the underside of the table ways are equipped with a shoe of a different metal, such as brass or bronze, there are two different metals bearing against each other, which of course, goes to make up a desirable quality of bearing. Furthermore, since the contacting surfaces of these two metals are constantly being flooded, any particles which may get on the bearing surfaces will quickly be washed away as the table reciprocates. A suitable filter may be installed in the lubricant supply so that clean oil will be supplied to the ways at all times.

In addition to the foregoing features, attention is also called to the details of construction of the bed 5. For all practical purposes, the bed 5 comprises a one-piece casting having a base with side walls merging into a relatively thick web portion, on one side of which are the cooling fluid collecting troughs 32 and 33, and on the other side are the trough-like ways 7 and 8. Connecting the trough-like ways 7 and 8 is an intermediate center depression which provides ample clearance for the rack 36. The design of this bed provides a very compact arrangement for the different structural parts which make up the whole.

Having thus described and shown an embodiment of this invention, what I claim and desire to secure by Letters Patent of the United States is:

1. A machine tool slide construction and lubricator therefor, comprising a trough-like slide on one machine part having an opening in the thickness thereof in communication with a source of lubricant supply, ways on another machine part mounted to slide in said trough-like slide, a lubricant distributing reservoir in said slidably mounted ways, and a shoe on said slidably mounted ways having openings in its thickness to establish a communication between the reservoir and the ways to be lubricated, said openings also successively establishing a communication between the reservoir and the opening in the trough-like slide when the slidably mounted ways slide in the trough-like ways; whereby the reservoir is intermittently supplied with lubricant.

2. In a machine tool, the combination of a plurality of slides, one of which is supported by another, a lubricant distributing reservoir in one of said slides, a slide shoe enclosing said reservoir having a plurality of lubricant ducts in its thickness for distributing lubricant to said slides, and means for keeping said reservoir filled with lubricant under pressure.

3. In a machine tool, the combination of a bed and table, slides on the bed and ways on the table mounted to slide on said bed slides, and means for lubricating the contacting bearing surfaces between the slides and ways, comprising, a forced feed lubricant supply including branch pipes, each branch communicating with an opening formed in the thickness of each bed slide, a shoe on the bottom of each of the table way, said shoes each enclosing a lubricant distributing reservoir formed in the table ways and having spaced openings communicating with said reservoirs; whereby reciprocation of the table will successively register the openings in the shoes with the openings in the bed slides to admit lubricant into the reservoirs from said forced feed lubricant supply and with the lubricant supplied to the reservoirs being constantly supplied to the contacting bearing surfaces between the slides and ways through the openings in the shoes.

4. Means for lubricating the slide between machine tool parts, comprising a lubricant reservoir in one of said parts having a series of lubricant discharge ducts in open communication with the slide, a source of lubricant supply under pressure, comprising a delivery pipe terminating with an open end in said slide; whereby the delivery ducts of the reservoir will successively register with said delivery pipe and maintain a supply of lubricant in said reservoir under pressure.

5. Means for lubricating the slide between machine tool parts as set forth in claim 4, in which the slide is equipped with a pan for collecting an excess of lubricant supplied to the slide and in which a pipe returns the lubricant collected in the pan to the source of lubricant supply.

6. A machine tool slide construction and lubricator therefor, comprising ways on one machine part having an opening in the thickness thereof in communication with a source of lubricant supply, ways on another machine part mounted to slide on said first named ways, a lubricant distributing reservoir in said second named machine part having a series of openings communicating with the ways on said first named machine part to establish communication between said reservoir and the ways on said first named machine part, said openings also successively establishing a communication with said source of lubricating supply when the second named machine part slides; whereby the reservoir is intermittently supplied with lubricant.

7. In a machine tool organization, the combination of a support providing an elongated guideway, means providing a source of lubricating fluid under pressure communicating with an opening in said guideway, a reciprocable member slidable along said guideway and closing said opening, and a reservoir in said member communicating with a port opening toward said guideway and positioned to register with said opening in at least one position of the member whereby to permit fluid to flow into the reservoir from said source, the lubricating fluid from the reservoir being distributed to the surface of said guideway in other positions of said member.

8. In a machine tool organization, the combination of a support providing an elongated guideway, means providing a source of lubricating fluid under pressure communicating with an opening in said guideway, a reciprocable member slidable in said gluideway and closing said opening, a reservoir in said member communicating with a port opening toward said guideway and positioned to register with said opening in at least one position of the member whereby to permit fluid from said source to flow into the reservoir, and a plurality of ducts spaced along said member and establishing communication with said reservoir and the surface of said guideway for distributing the fluid to the latter.

JOHN R. JOHNSON.